(No Model.)
O. N. GULDLIN.
VALVE MECHANISM FOR WATER GAS APPARATUS.
No. 567,709. Patented Sept. 15, 1896.
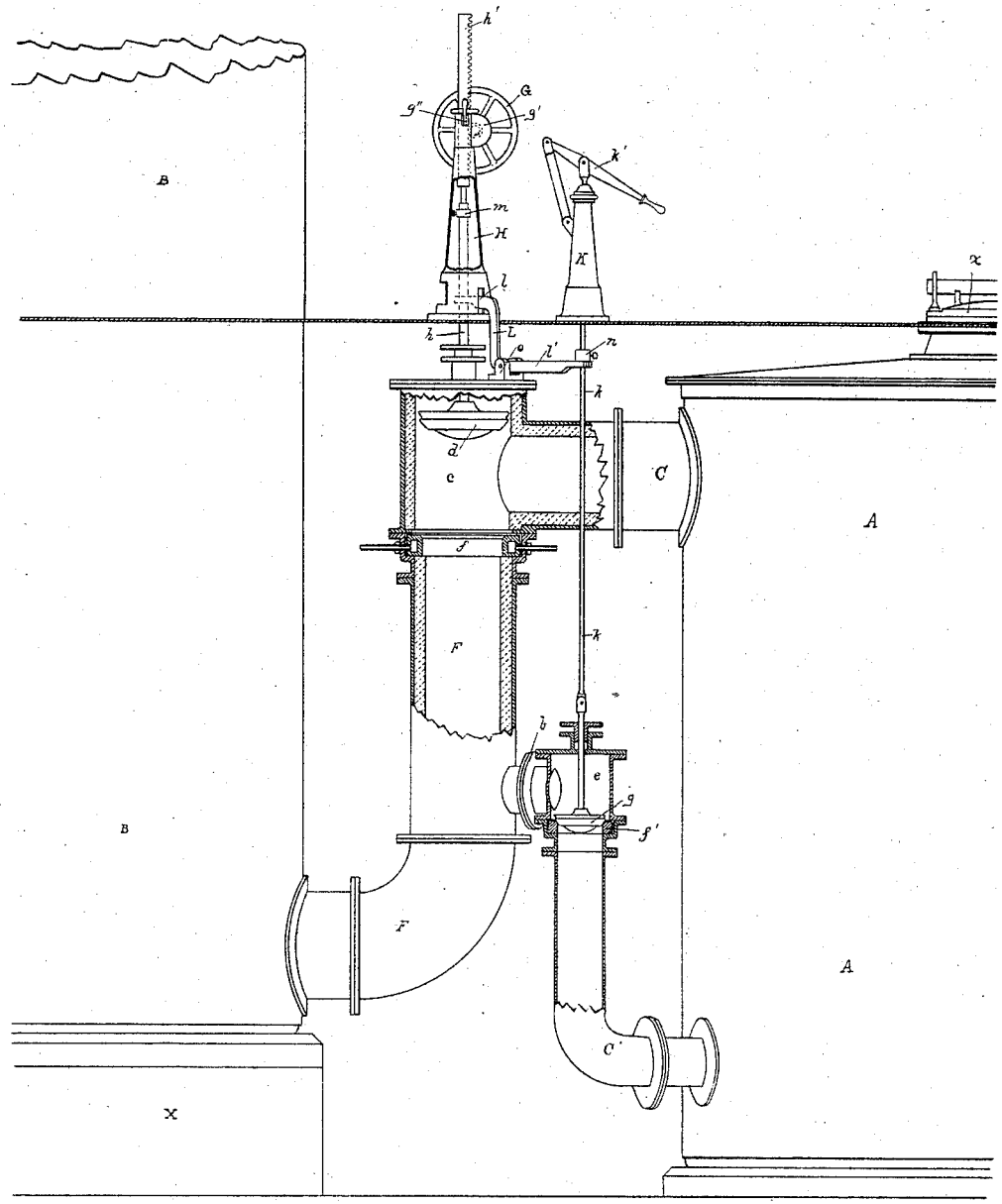
WITNESSES:
C. C. Clark
M. R. M. Frayjser.
INVENTOR
Olaf N. Guldlin
BY
E. B. Clark
ATTORNEY.

UNITED STATES PATENT OFFICE.

OLAF N. GULDLIN, OF FORT WAYNE, INDIANA.

VALVE MECHANISM FOR WATER-GAS APPARATUS.

SPECIFICATION forming part of Letters Patent No. 567,709, dated September 15, 1896.

Application filed January 20, 1894. Serial No. 497,497. (No model.)

*To all whom it may concern:*

Be it known that I, OLAF N. GULDLIN, a citizen of the United States, residing at Fort Wayne, in the county of Allen and State of Indiana, have invented certain new and useful Improvements in Valve Mechanism for Water-Gas Apparatus; and I do hereby declare the following to be a full, clear, and exact description of the invention, such as will enable others skilled in the art to which it appertains to make and use the same.

This invention relates to connecting pipes and valves between a water-gas generator and the superheater or fixing-chamber, and more particularly to the valve-operating mechanism.

My present invention is an improvement upon the combination valve connection described and claimed in my patent, No. 510,506, dated December 12, 1893, in which the gas-escape pipes leading, respectively, from the top and bottom of the generator are each provided with a valve, which are connected to the opposite ends of a centrally-pivoted operating-lever, the valves being so adjusted and arranged that one counterbalances the weight of the other, and so that one cannot be closed without opening the other, for the purpose of permitting at all times a free escape of gas or products from the generator to the superheater.

The object of my present invention is to provide for conveniently and quickly operating large heavy valves in the gas-escape pipes leading respectively from the top and bottom of the generator, and also to provide suitable connections between the rods of the respective valves, to insure that when one valve is closed the other shall be opened, in order that a free passage may at all times be provided for the escape of gas or products from the gas-generator to the superheater and thereby prevent any accident which might be caused by the closure of both valves at the same time.

The matter constituting my invention will be defined in the claims.

The details of construction of my improvements are shown in the accompanying drawing, in which the apparatus is shown partly in side elevation and partly in vertical section.

The gas-generating furnace A is of the usual construction, and in practice is provided with the usual air-blast pipe, steam-supply pipes at top and bottom, and ash-door, (not here shown,) and at the top with a fuel-opening and tight-fitting lid $x$. Gas-escape pipes C and C' connect, respectively, with the top and bottom of generator A, and also with the gas-delivery pipe F, which connects with the bottom of the superheater or fixing-chamber B. A cylindrical valve-chamber $c$ is connected between the eduction-pipe C and the delivery-pipe F, and is preferably provided with a hollow annular valve-seat $f$, provided with inlet and outlet pipes for the circulation of water or steam. The pipes C and F and valve-chamber $c$ are preferably lined with fire-brick, as shown. The lower gas-eduction pipe C' is provided with a valve-chamber $e$, which connects by a short pipe $b$ with the delivery-pipe F. The valve-chamber $e$ is provided with an annular valve-seat $f'$. In the valve-chambers $c$ and $e$, I preferably use the ball or hemispherical valves $d$ and $g$, adapted to fit tightly upon their respective seats $f$ and $f'$, and said valves are provided with stems or rods $h$ and $k$, passing, respectively, into stands H and K. The valve-stem $h$ has secured to its upper end the toothed rack-bar $h$, which is guided in the stand H, and has meshing with it a pinion $g'$, upon a short transverse shaft having at its outer end a hand-wheel G, said shaft being suitably journalled in the stand H. A locking pin or catch $g''$ is provided for engaging with the rack-bar $h'$ for holding it in any desired position, so that the valve $d$ may be held in a raised position or may be locked upon its seat. The rod $k$ of the valve $g$ passes up through stand K, and is pivotally connected at the top to the quick-operating lever $k'$, which at one end is pivotally connected to a link which is pivotally connected to the stand K, as shown.

The rods $h$ and $k$ of the two valves are loosely connected through the medium of the bent pivoted lever L, and each rod is provided with an adjustable tappet $m$ and $n$. The bent lever L is pivoted to a short stand $o$, and has an upper arm $l$ and a lower arm $l'$, each of which arms is in practice slotted or forked to embrace the valve-rods $h$ and $k$, as shown. The adjustable tappets or collars m and n are secured by set-screws upon the valve-rods h and k so as to be above the ends of the lever L and in such relative positions that the closing down of either one of the valves will cause one of the tappets to bear upon one of the arms of the bent lever and automatically open the other valve before the valve which is being forced downward is fully closed. One of the valves having been raised from its seat by the operation of forcing down the other valve through the medium of the collar on the valve-rod which is being forced down bearing upon the end of the lever L, then the other valve is fully raised in its box by means of its own operating mechanism. This mechanism and method of operating it is particularly desirable in the case of large or heavy valves.

In the manufacture of gas the valves will be operated as follows: When it is desired to blow up the fuel for heating it to incandescence by, admitting a blast of air at the base of the generator A valve g is closed, and during this operation the tappet or collar n on rod k will strike against the end l' of the bent lever and cause the other end l to strike against the collar m on rod h and raise the valve d. Should the valve d be too heavy to be raised from its seat by the above operation, it will have to be raised by means of the hand-wheel G and pinion g' engaging with the rack-bar h' before valve g can be tightly closed upon its seat. Valve d will be held in its raised position by means of the lock g''. The products of combustion now pass from the generator through pipes C and F into the superheater, where they heat the brick checkerwork in the usual manner. The generator and superheater being heated to the proper temperature, the air-blast is shut off, and gas can now be made by an up-run; that is, by admitting steam below the grate or at the base of the generator and passing it up through the fuel, where decomposition takes place and the resulting water-gas passes off through pipe C, valve-chamber c, and pipe F into the superheater.

After a subsequent heating up of the generator and superheater by the air-blast, as above explained, gas may be generated by a down-run, and for this purpose the valves must be reversed from the position shown in the drawing. Valve d is closed downward upon its seat, and during its descent the collar m on rod h strikes the end l of lever L, and thereby causes the end l' to strike against the collar n on rod k and raise the valve g from its seat, so that an opening is made from the generator to the superheater through the valve-box e before valve d is closed upon its seat. Steam may now be admitted at the top of generator A and pass down through the body of incandescent fuel, resulting in its decomposition to form water-gas, which is passed off through pipe C, valve-chamber e, and pipe F into the superheater B. The valve g may be fully opened by hand-lever k' and locked in a raised position by any suitable locking device.

It will thus be seen that my pipes and valve connection between the generator and superheater provides for making both up and down runs through the generator and for conducting the gas at will from either the top or bottom thereof to the superheater without the possibility of both of the eduction-pipes and valves being closed at the same time, and thereby preventing any explosion or other accident which might occur if there were not at all times a free passage for the gas or products of combustion from the generator to the superheater.

Having described my invention, what I claim, and desire to secure by Letters Patent, is—

1. The combination with the generator and superheater and gas-eduction pipes leading respectively from the top and bottom of the generator, and each having a valve-chamber, of suitable valves in said chambers, rods as h and k, connecting with said valves, independent means for raising and lowering each of said rods, and a pivoted lever engaging at its opposite ends with said valve-rods, whereby one valve must be raised from its seat before the other is forced to its seat, substantially as described.

2. The combination with a generating-furnace having eduction-pipes at top and bottom thereof and said pipes having valve-chambers, of suitable valves in said chambers having rods as h and k, means for separately raising and lowering each rod and valve, adjustable tappets or collars n and m, on said rods, and a lever as L, pivoted between said rods with its ends below said collars, and adapted to be engaged or borne upon thereby, whereby the closure of one valve will cause the other valve to be raised from its seat and always provide a free escape-passage through one of the pipes leading from the generator, substantially as described.

In testimony whereof I affix my signature in presence of two witnesses.

OLAF N. GULDLIN.

Witnesses:
  H. C. HARTMAN,
  H. C. COOLICAN.